(12) United States Patent
Tom et al.

(10) Patent No.: US 10,258,880 B2
(45) Date of Patent: *Apr. 16, 2019

(54) DYNAMIC SELECTION OF VOICE QUALITY OVER A WIRELESS SYSTEM

(71) Applicant: Microsoft Technology Licensing, LLC, Redmond, WA (US)

(72) Inventors: Dennis Tom, Redmond, WA (US); Loren Reas, Kent, WA (US); Eric Filer, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 426 days.

This patent is subject to a terminal disclaimer.

(21) Appl. No.: 15/084,198

(22) Filed: Mar. 29, 2016

(65) Prior Publication Data

US 2016/0206956 A1    Jul. 21, 2016

Related U.S. Application Data

(63) Continuation of application No. 12/147,887, filed on Jun. 27, 2008, now Pat. No. 9,327,193.

(51) Int. Cl.
*H04W 28/20* (2009.01)
*H04W 28/22* (2009.01)
(Continued)

(52) U.S. Cl.
CPC .............. *A63F 13/31* (2014.09); *A63F 13/10* (2013.01); *A63F 13/215* (2014.09);
(Continued)

(58) Field of Classification Search
CPC .... H04L 41/0896; H04L 47/76; H04W 28/16; H04W 28/20; H04W 28/22;
(Continued)

(56) References Cited

U.S. PATENT DOCUMENTS 5,115,309 A * 5/1992 Hang ..................... H04N 19/63
348/388.1
5,546,395 A    8/1996 Sharma et al.
(Continued)

OTHER PUBLICATIONS

Sasaki et al.; "Variable Rate Voice Coding System"; IEEE, http://www.ieeexplore.ieee.org/iel2/638/6278/0035506+.pdf?tp=&isnumber=&arnumber=244056, 1992, p. 364-367

*Primary Examiner* — Milap Shah
(74) *Attorney, Agent, or Firm* — Alleman Hall Creasman & Tuttle LLP

(57) ABSTRACT

Various systems, methods, and computer readable instructions are disclosed herein for dynamically allocating fixed bandwidth over a wireless link between a video game console and a wireless peripheral device. In an embodiment, the voice sample rate in a wireless microphone may be dynamically adjusted to free up bandwidth that can be repurposed for other operations. The sample rate adjustment can range from maximum where the bandwidth is filled with voice data to a lesser sample rate. In the case where the sample rate is less than max, the freed up bandwidth can be for used for other operations.

20 Claims, 10 Drawing Sheets

(51) Int. Cl.
    *A63F 9/24*     (2006.01)
    *A63F 13/00*     (2014.01)
    *A63F 13/31*     (2014.01)
    *A63F 13/235*     (2014.01)
    *H04L 12/24*     (2006.01)
    *H04L 12/917*     (2013.01)
    *A63F 13/424*     (2014.01)
    *A63F 13/215*     (2014.01)
    *A63F 13/40*     (2014.01)
    *A63F 13/335*     (2014.01)
    *G10L 19/00*     (2013.01)
    *A63F 13/211*     (2014.01)

(52) U.S. Cl.
    CPC .......... *A63F 13/235* (2014.09); *A63F 13/335* (2014.09); *A63F 13/424* (2014.09); *G10L 19/0019* (2013.01); *H04L 41/0896* (2013.01); *H04L 47/76* (2013.01); *A63F 13/211* (2014.09); *A63F 2300/1031* (2013.01); *A63F 2300/1081* (2013.01); *A63F 2300/209* (2013.01)

(58) Field of Classification Search
    CPC .... A63F 13/211; A63F 13/215; A63F 13/235; A63F 13/31; A63F 13/335; A63F 13/424; A63F 2300/1031; A63F 2300/1081; A63F 2300/209
    See application file for complete search history.

(56) References Cited

U.S. PATENT DOCUMENTS

| | | | |
|---|---|---|---|
| 5,617,145 A | 4/1997 | Huang et al. | |
| 5,835,495 A | 11/1998 | Ferriere | |
| 5,956,330 A | 9/1999 | Kerns | |
| 6,111,863 A | 8/2000 | Rostoker et al. | |
| 6,373,855 B1 | 4/2002 | Downing et al. | |
| 6,470,180 B1 | 10/2002 | Kotzin et al. | |
| 6,510,210 B1 | 1/2003 | Baughan | |
| 6,579,184 B1 | 6/2003 | Tanskanen | |
| 6,691,084 B2 | 2/2004 | Manjunath et al. | |
| 6,708,209 B1 | 3/2004 | Ebata et al. | |
| 6,751,477 B1 | 6/2004 | Alperovich et al. | |
| 7,069,326 B1 | 6/2006 | Bush | |
| 7,292,164 B1 | 11/2007 | Wegener | |
| 7,324,491 B1* | 1/2008 | Benveniste ............ | H04L 12/66 370/338 |
| 7,519,725 B2 | 4/2009 | Alvarez et al. | |
| 7,728,217 B2 | 6/2010 | Obermeier | |
| 7,843,876 B2* | 11/2010 | Holt ....................... | G07F 17/32 345/473 |
| 8,027,290 B2* | 9/2011 | Balachandran ....... | H04L 45/125 370/328 |
| 2002/0044528 A1 | 4/2002 | Pogrebinsky et al. | |
| 2003/0003920 A1* | 1/2003 | Sebastian .............. | H04W 28/20 455/452.1 |
| 2003/0086393 A1* | 5/2003 | Vasudevan ........... | H04L 1/0006 370/330 |
| 2004/0010585 A1 | 1/2004 | Jones et al. | |
| 2004/0082383 A1 | 4/2004 | Muncaster et al. | |
| 2004/0098456 A1 | 5/2004 | Krzyzanowski et al. | |
| 2004/0143663 A1* | 7/2004 | Leedom ................. | H04L 47/15 709/226 |
| 2004/0190528 A1 | 9/2004 | Dacosta | |
| 2004/0228291 A1 | 11/2004 | Huslak et al. | |
| 2004/0252698 A1 | 12/2004 | Anschutz et al. | |
| 2005/0007991 A1* | 1/2005 | Ton ........................ | H04L 12/14 370/349 |
| 2005/0031127 A1 | 2/2005 | Gosior et al. | |
| 2005/0202827 A1* | 9/2005 | DeMarco .......... | H04W 72/0453 455/452.2 |
| 2006/0067243 A1* | 3/2006 | Bejerano ............. | H04L 41/0663 370/252 |
| 2006/0084504 A1 | 4/2006 | Chan et al. | |
| 2006/0165090 A1* | 7/2006 | Kalliola ................. | H04L 29/06 370/395.21 |
| 2006/0256819 A1 | 11/2006 | Lum et al. | |
| 2006/0280271 A1 | 12/2006 | Oshikiri | |
| 2007/0002743 A1* | 1/2007 | Fan ....................... | H04W 28/20 370/235 |
| 2007/0064604 A1 | 3/2007 | Chen et al. | |
| 2007/0081507 A1* | 4/2007 | Koo .................... | H04B 7/15542 370/338 |
| 2007/0174050 A1 | 7/2007 | Li et al. | |
| 2007/0202954 A1 | 8/2007 | Morrow et al. | |
| 2008/0004115 A1 | 1/2008 | Chatani | |
| 2008/0058104 A1 | 3/2008 | Nishida | |
| 2008/0112370 A1* | 5/2008 | Kwon ................... | H04W 28/20 370/336 |
| 2008/0115121 A1 | 5/2008 | Douceur et al. | |
| 2008/0139311 A1 | 6/2008 | Bates et al. | |
| 2009/0029714 A1* | 1/2009 | Rudrapatna ........... | H04L 5/0053 455/452.2 |
| 2009/0029777 A1 | 1/2009 | Holt et al. | |
| 2009/0098940 A1 | 4/2009 | Sangberg | |
| 2009/0318235 A1 | 12/2009 | Ashida et al. | |
| 2014/0057723 A1* | 2/2014 | Cudak .................... | A63F 13/12 463/42 |

\* cited by examiner

DYNAMIC SELECTION OF VOICE QUALITY OVER A WIRELESS SYSTEM

CROSS-REFERENCE TO RELATED APPLICATIONS

This application is a continuation of U.S. patent application Ser. No. 12/147,887, filed Jun. 27, 2008, the disclosure of which is incorporated herein by reference.

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2006, 2007 Microsoft Corp.

FIELD OF TECHNOLOGY

The presently disclosed subject matter relates to the field of computing and electronics, and more particularly, to fields such as entertainment consoles, although these are merely exemplary and non-limiting fields.

BACKGROUND OF THE INVENTION

Video game and entertainment systems are increasingly incorporating new accessories for providing user interfaces and control actions. For example, wireless features and accessories such as steering wheels and motion sensors are becoming increasingly common. Microphones and musical instrument simulators are also becoming popular.

One drawback of wireless accessories is the limited bandwidth. Wireless accessories typically use ISM frequency bands that must compete with other wireless systems, and are often subject to other limitations. Wireless microphones are one such wireless accessory that does not necessarily require maximum data bandwidth on a continuous basis. For example, during time periods where the user is not speaking into the microphone, voice data does not need to be transmitted, and thus the data channel may be used for other purposes. It would be advantageous to better utilize the data bandwidth resources in such cases.

SUMMARY OF THE INVENTION

Various systems, methods, and computer readable instructions are disclosed herein for dynamically selecting the voice sample rate (and hence the quality) in a wireless microphone to free up bandwidth in the wireless system that can be repurposed for other operations. For example, an additional voice input could be added, another data source can be used for transmission, or the clock of the CPU could be reduced to save battery life.

In an embodiment, in a gaming system the game software can command or request a different voice sample rate on the wireless microphone dynamically and allow for other operations to occur that it otherwise couldn't due to bandwidth constraints. In another embodiment, an interactive microphone device can either be requested by a console or self selectable where the audio sample rate can be dynamically adjusted. The sample rate adjustment can range from maximum where the bandwidth is filled with voice data to a lesser sample rate. In the case where the sample rate is less than max, the freed up bandwidth can be for used for other operations.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are illustrated. However, the disclosure is not limited to the specific aspects shown. The following figures are included.

DETAILED DESCRIPTION OF ILLUSTRATIVE EMBODIMENTS

Exemplary Game Console, PC, and Networking Aspects

Figure 1:
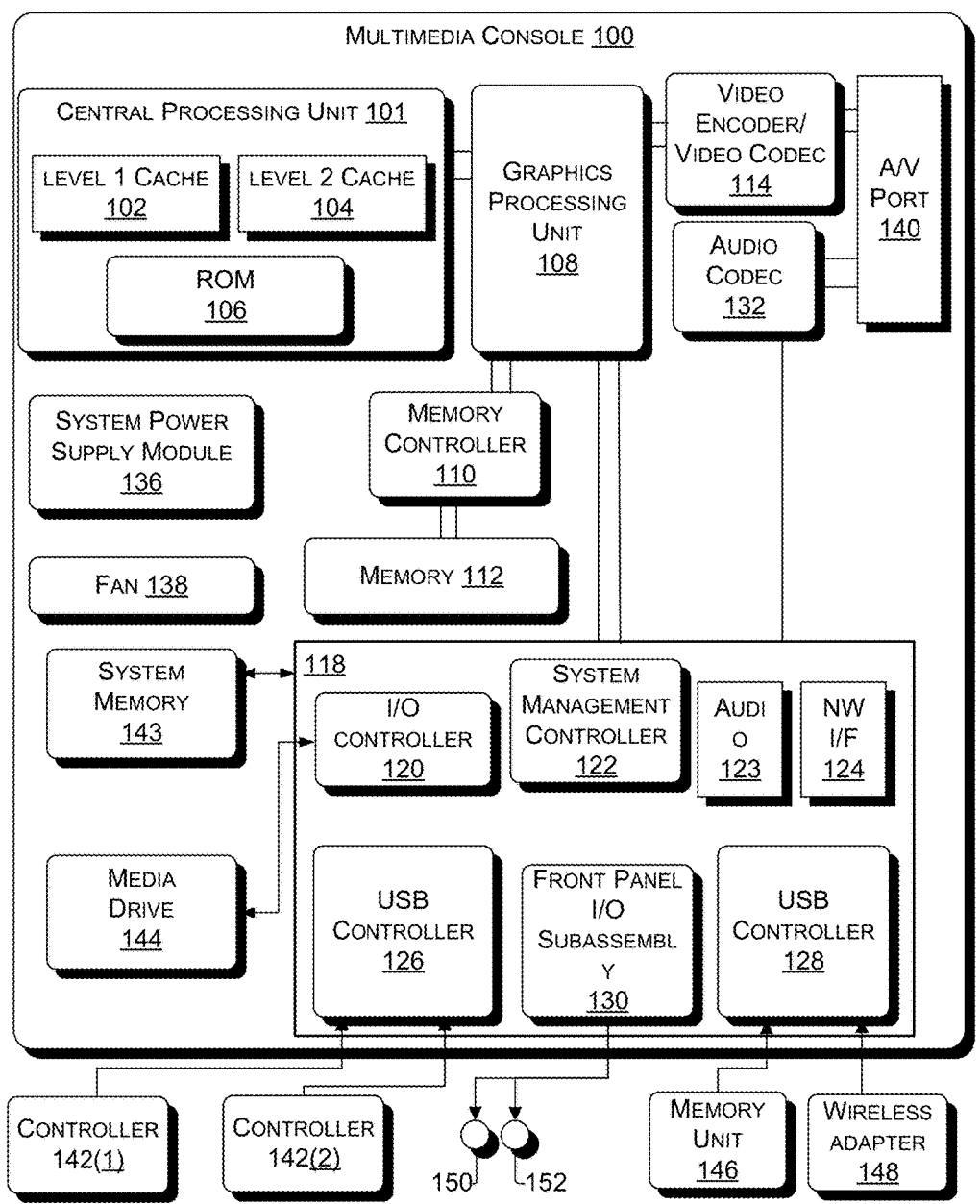
FIG. 1 illustrates an exemplary console for subject matter discussed herein.

This section of the present disclosure provides the general aspects of an exemplary and non-limiting game console. Referring now to FIG. 1, a block diagram shows an exemplary multimedia console. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a flash memory device (not shown). Furthermore, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present disclosure described above. Audio data is carried between the audio processing unit 123 and the audio codec 126 via a communication link. The audio processing pipeline outputs data to the AN port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community. In this latter scenario, the console 100 may be connected via a network to a server, for example.

Figure 2:
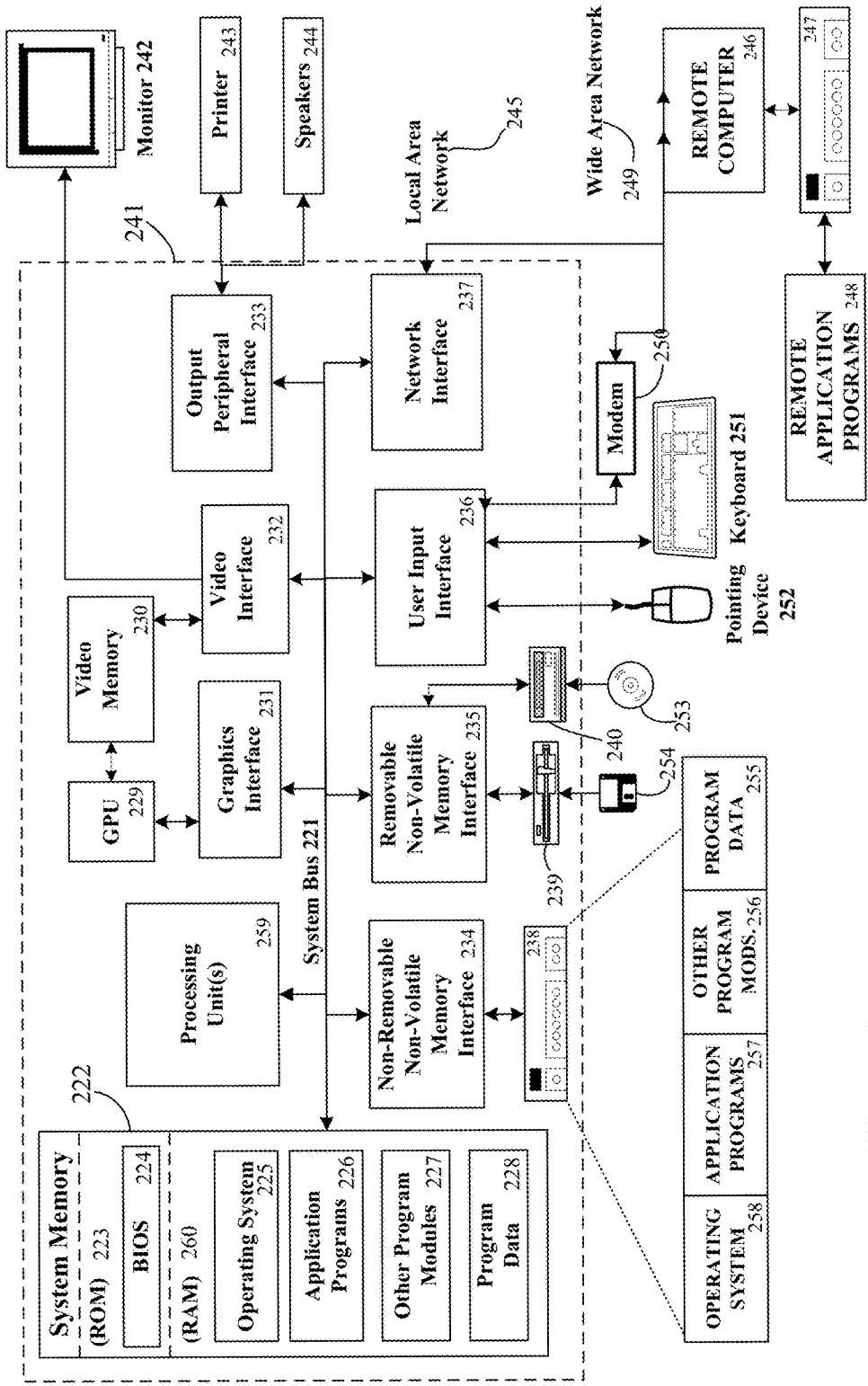
FIG. 2 illustrates an exemplary computing environment for subject matter discussed herein.

Second, now turning to FIG. 2, illustrated is a block diagram representing an exemplary computing device that may be suitable for use in conjunction with implementing the subject matter disclosed above. Numerous embodiments of the present disclosure may execute on a computer. For example, the computer executable instructions that carry out the processes and methods for providing PC experiences on gaming consoles may reside and/or be executed in such a computing environment as shown in FIG. 1. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2, provide storage of computer readable instructions, data structures, program modules and other data for the computer 241. In FIG. 2, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It may be appreciated that the network connections shown are exemplary and other means of establishing a communications link between the computers may be used.

Figure 3:
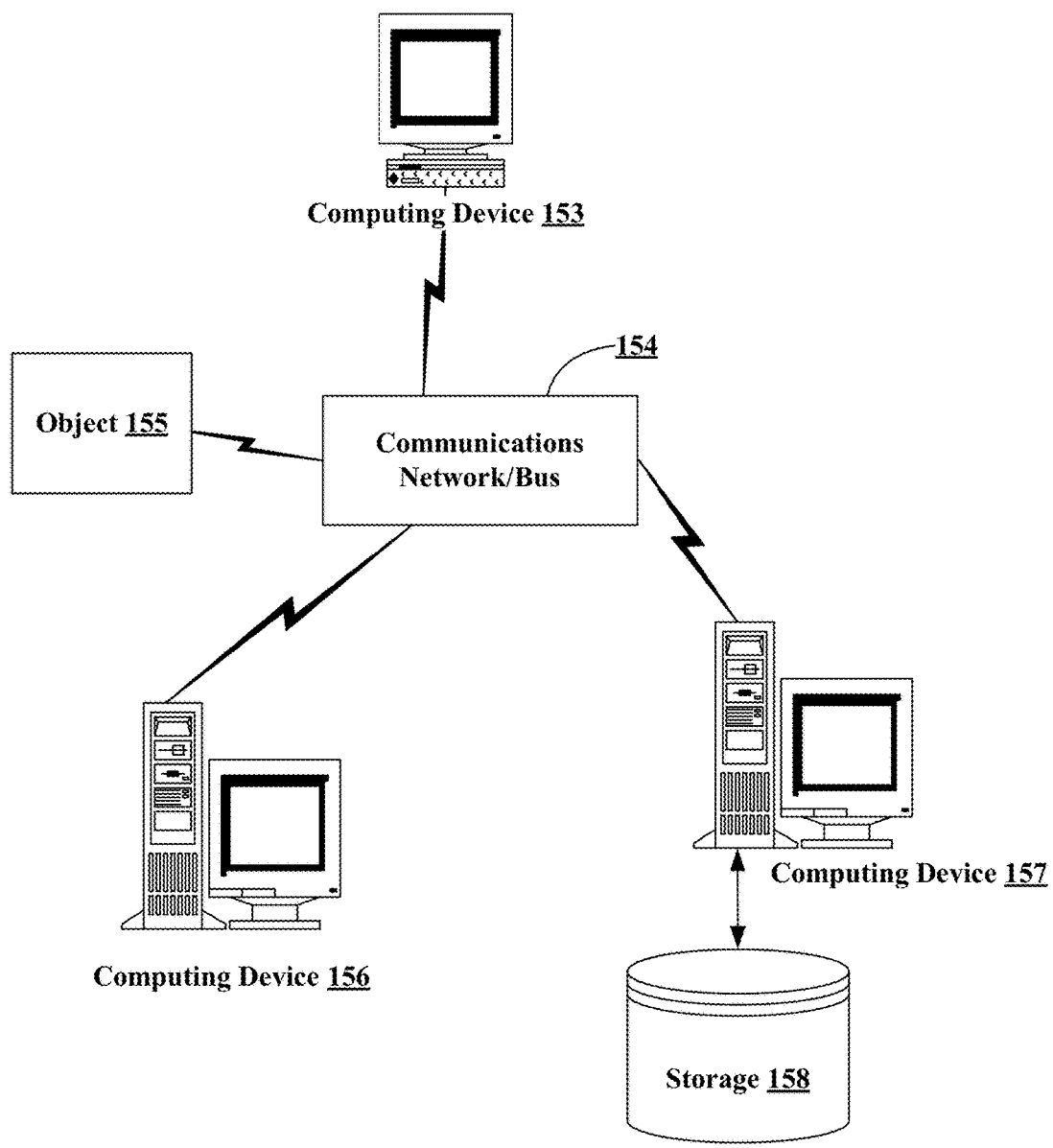
FIG. 3 illustrates an exemplary networking environment for subject matter discussed herein.

FIG. 3 provides a schematic diagram of an exemplary networked or distributed computing environment. The environment comprises computing devices 153, 156, and 157 as well as object 155 and database 158. Each of these entities 153, 155, 156, 157, and 158 may comprise or make use of programs, methods, data stores, programmable logic, etc. The entities 153, 155, 156, 157, and 158 may span portions of the same or different devices such as PDAs, audio/video devices, MP3 players, smart phones, DVD players, cable box tuners, or just about any computing devices capable of remoted content provided by server PCs. Each entity 153, 155, 156, 157, and 158 can communicate with another entity 153, 155, 156, 157, and 158 by way of the communications network 154. In this regard, any entity may be responsible for the maintenance and updating of a database 158 or other storage element.

This network 154 may itself comprise other computing entities that provide services to the system of FIG. 3, and may itself represent multiple interconnected networks. In accordance with an aspect of the presently disclosed subject matter, each entity 153, 155, 156, 157, and 158 may contain discrete functional program modules that might make use of an API, or other object, software, firmware and/or hardware, to request services of one or more of the other entities 153, 155, 156, 157, and 158.

It can also be appreciated that an object, such as 155, may be hosted on another computing device 156. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 3, any entity 153, 155, 156, 157, and 158 can be considered a client, a server, or both, depending on the circumstances. And, moreover, regarding the entertainment console, it can be a client to a server.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 3 and the further diversification that can occur in computing in a network environment such as that of FIG. 3, the systems and methods provided herein cannot be construed as limited in any way to a particular computing architecture or operating system. Instead, the presently disclosed subject matter should not be limited to any single embodiment, but rather should be construed in breadth and scope in accordance with the appended claims. Thus, for example, although game consoles and server PCs have been discussed, just as easily full desktops could be remoted to smart phones as a means to access data and functionality that is otherwise unavailable to smart phones.

Finally, it should also be noted that the various techniques described herein may be implemented in connection with hardware or software or, where appropriate, with a combination of both. Thus, the methods, computer readable media, and systems of the presently disclosed subject matter, or certain aspects or portions thereof, may take the form of program code (i.e., instructions) embodied in tangible media, such as floppy diskettes, CD-ROMs, hard drives, or any other machine-readable storage medium, where, when the program code is loaded into and executed by a machine, such as a computer, the machine becomes an apparatus for practicing the subject matter.

In the case of program code execution on programmable computers, the computing device may generally include a processor, a storage medium readable by the processor (including volatile and non-volatile memory and/or storage elements), at least one input device, and at least one output device. One or more programs that may utilize the creation and/or implementation of domain-specific programming models aspects of the present disclosure, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

Wireless Peripheral Interface

A video game system may provide a platform for wireless accessories such as game controllers and microphones. Video game and entertainment systems are increasingly incorporating new accessories for providing user interfaces and control actions. For example, wireless features and accessories such as steering wheels and motion sensors are becoming increasingly common. Microphones and musical instrument simulators are also becoming popular. A wireless microphone may further include other functions such as motion sensors and accelerometers.

Various technologies may be used to implement the wireless communications link. For example, to provide a common interface with as many off-the-shelf CPU parts as possible and to support the required data traffic, a Serial Peripheral Interface (SPI) based design may be implemented. SPI is an interface that enables the serial exchange of data between a master and a slave device. SPI typically uses a synchronous protocol, where transmitting and receiving is guided by a clock signal generated by master microcontroller. The SPI interface allows the connection of several SPI devices while a master selects each device with a CS (Chip Select) signal. SPI is a synchronous serial data link standard. Devices communicate in a master/slave mode where the master device initiates the data frame. Multiple slave devices are allowed with individual chip select lines.

A smart transceiver device may provide receiver and transmitter functions for physical and link wireless communications layers. In particular, the PHY and Link layers of a wireless protocol stack, and wireless protocol functionality for such a device may be implemented in a wireless application specific integrated circuit (ASIC). In one embodiment, the smart transceiver may be the slave and a master control application may be the master of an SPI bus.

Wireless communication may be provided using a frequency hopping digital radio protocol with time-division multiplexed access (TDMA) granting radio time for each wireless accessory. The unlicensed worldwide 2.4 GHz Industrial Scientific Medical (ISM) radio band may be utilized. A minimum of external components may be needed to implement a complete Frequency Hopping Spread Spectrum (FHSS) 2.4 GHz ISM band digital radio transceiver compliant with worldwide regulatory requirements.

The smart transceiver device may be designed to simultaneously support up to four data and voice accessories or four data-only and 4 voice-only accessories, or any combination in between. The smart transceiver, when implemented in a wireless accessory, may communicate with wireless video game consoles or a wireless enabled personal computer or other computing device that is equipped with a similar smart transceiver.

The smart transceiver is a platform that may be used to support various product configurations. Firmware within the smart transceiver may be adjusted to support various product versions, without changing the chip hardware. In a video game system, the smart transceiver may be used to support video console products, game controller products, and various peripheral products.

Dynamic Data Control

One drawback of using wireless accessories in a system may be limited bandwidth. Furthermore, wireless accessories typically use ISM frequency bands that must compete with other wireless systems, and are often subject to other limitations such as interference from microwave ovens. Because wireless bandwidth is fixed for a given frequency band and link technology, wireless systems need to efficiently use the available bandwidth. In a system where data requirements are dynamic, a bandwidth allocation scheme that reallocates the available bandwidth based on current data requirements may provide more efficient bandwidth utilization.

A wireless microphone is one such wireless accessory that does not necessarily require maximum data bandwidth on a continuous basis. For example, during time periods where the user is not speaking into the microphone, voice data does not need to be transmitted, and thus the data channel may be used for other purposes. Wireless microphones are merely exemplary and many other types of wireless devices may be considered, such as wireless game controllers, wireless musical instrument peripherals, and the like.

Figure 4:
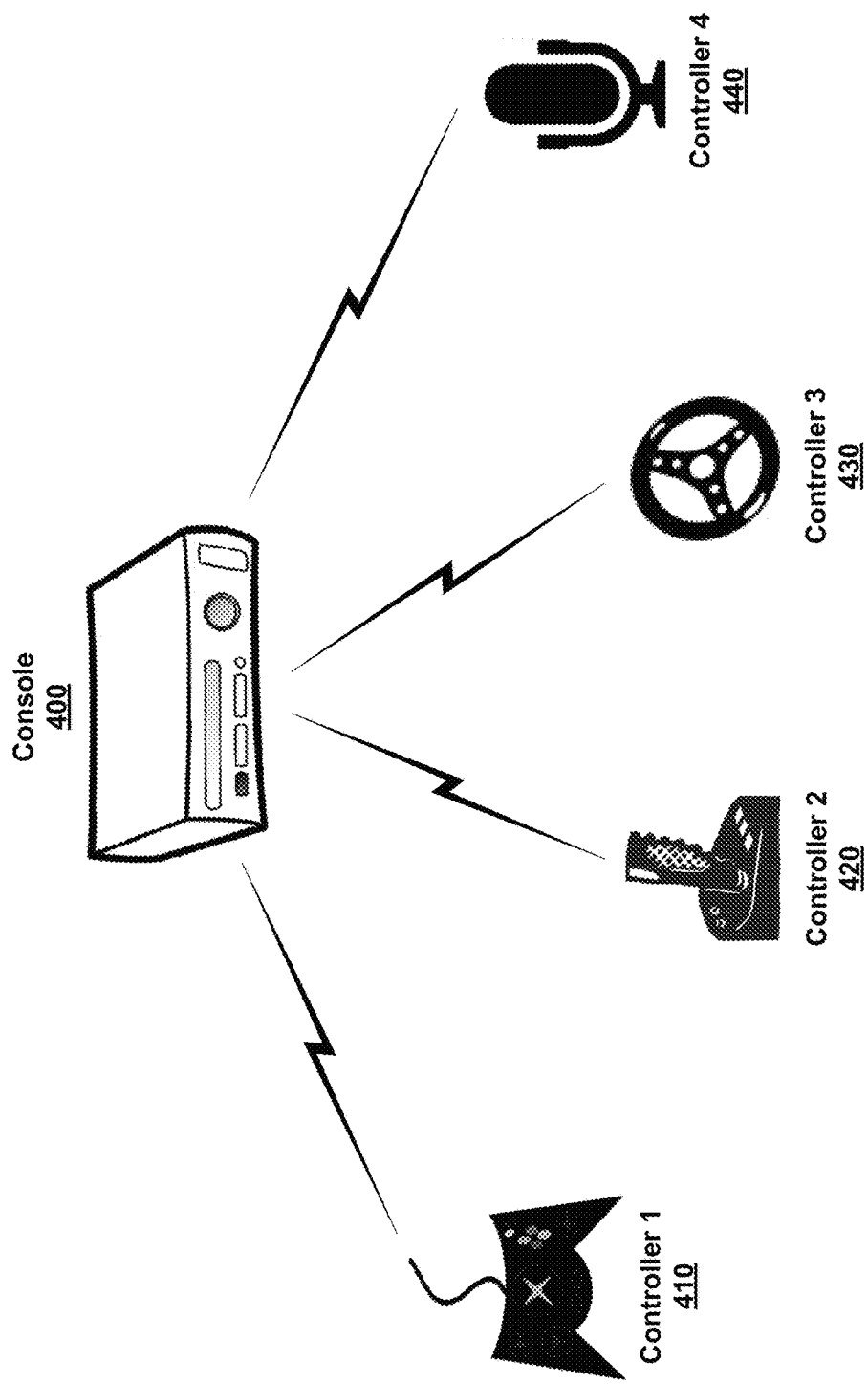
FIG. 4 illustrates an exemplary video game system.

FIG. 4 depicts an exemplary video game system comprising a media console 400 and various wireless peripherals that may be used in conjunction with the console. A standard game controller 1 410 may comprise at least one directional controller and A, B, X, Y buttons. Controller 2 420 may comprise user action buttons as well as a joystick device. Controller 3 430 may comprise a wireless steering wheel for driving game applications. Controller 4 440 may comprise a wireless microphone that may be used for applications that use voice inputs from the user.

In various embodiments, methods, systems, and computer readable media containing instructions for dynamically allocating bandwidth in a wireless link is disclosed. In various embodiments, a data quality measure is determined that indicates the amount of data desired for a particular data parameter. The data quality measure may be based on the video game context and may indicate, for example, data precision, data resolution, sampling rate, data frequency, and the like. In various embodiments, the data quality measure may be indicated by a video game console, a video game peripheral, or other system component, through a data quality index indicative of the data quality measure. The data quality index may be any variable type indicating a number, letter, data word, or any other representation that provides an indication of the desired data quality measure for a data parameter to be transmitted or received via a wireless link in the system.

In one embodiment, a method of dynamically selecting a voice sample rate (and hence the quality) in a wireless microphone is disclosed. Dynamic data quality selection may free up bandwidth in the wireless system, and thus the overall bandwidth can be repurposed for other operations. For example, when using wireless microphones, additional voice inputs may be added, a different data source may be used for transmission, or the clock of the CPU may be reduced to save battery life.

In an embodiment, the game software can command or request a different voice sample rate on the wireless microphone dynamically and allow for other operations that may have been unavailable due to bandwidth constraints. In other embodiments, an interactive microphone device may either be requested by a console or self selectable where the audio sample rate can be dynamically adjusted. The sample rate adjustment may range from a maximum rate where the bandwidth may be filled with voice data, to a lesser sample rate where the sample rate is less than maximum rate, thus allowing for bandwidth that may be for used for other operations.

The specific data that may be transmitted over the wireless link may be of any type that is typically transmitted between a peripheral device and a game console. For example, a wireless microphone may transmit sampled voice data. A device may comprise motion sensors, gyroscopes, and/or accelerometers and may transmit acceleration, velocity, and/or position data. A peripheral associated with a music application may transmit data related to the position of various musical instrument simulators. A wireless steering wheel device may transmit the direction and rate at which the steering wheel is being turned. Other peripherals may comprise a combination of sensors and data input devices.

The dynamic selection of data quality may be performed in a number of ways. In one embodiment, the game console executing the video software application may determine the data quality based on the context of the video game. Video games may be designed in narrative form and may comprise a series of scenes. Each scene or part of a scene may be associated with a particular data quality indicator for a parameter that is expected from a peripheral device or controller. For example, a particular scene may require that the player respond with physical motions using a wireless peripheral that includes a microphone and a motion sensor. During such a scene, voice data may not be needed by the application. The video game context may be based upon the data quality indicator or data quality measure may be determined in a number of ways. For example, each video game scene may be associated with a scene descriptor that indicates the general category of the scene. For example, the scene descriptor may indicate the user interaction mode of a scene, such as "voice input expected," "controller movement expected", "button press expected," and the like.

The console may then send a command to the peripheral indicating that voice data sampling may be reduced or suspended, and may further indicate that motion sensor data be sampled at the maximum rate. The wireless peripheral may then increase the amount of motion sensor data transmission to the console, either by sending additional data packets using additional channels, or using a greater number of bits in a fixed or variable length data and command word. As known in the art, a number of ways of increasing data transmission over a fixed link is possible—using more channels, using a greater number of bits in a formatted message, increasing the frequency of data transmissions, and the like.

In another embodiment, some games may be predominantly defined by rules and the player interaction, and thus the data quality indicator may be associated with a user action or a particular mode of play. For example, a wireless peripheral may comprise a microphone and a motion sensor. A mode within a game application may further allow the player to choose between providing a voice input or a motion input. If the player chooses to provide a motion input, the console and/or peripheral may determine that the voice sampling rate may be reduced or temporarily suspended in order to maximum bandwidth for transmission of motion data.

In yet another embodiment, a game may provide a data quality indicator indicating the video game context via an application programming interface (API) that may be provided by the console to provide interface support to the game application. The API may, for example, provide for a data structure that indicates the current data quality indicator for one or more data items. Thus the game application may provide indication to the console of the data frequency or data resolution to be transmitted during a particular segment of the game, as indicated by parameters provided via the API. The data quality indicator may be provided at a higher level of abstraction, allowing for the console to determine a specific data rate or frequency. For example, the data quality indicator for a voice channel may be High, Medium, and Low. In other embodiments, the data quality indicator may be more specific, such as a particular data resolution or sampling frequency.

It should be noted that the process of dynamic selection of data quality may occur in the console, applications executing in the console, the peripheral, any combination thereof, or any other device or means. The dynamic selection may take place when the data quality index can be ascertained, however obtained. As discussed above, the console may detect and determine the selection based on the video game context based on information from the video game application. The information may be inferred or provided explicitly, for example through an API. The console may also determine a video game context and data quality index based on user interactions with the video game application. As discussed above, such interactions may include motions detected by the wireless peripheral. User interactions may also include commands entered by the user, a voice input provided by the user and detected by the peripheral, or other inputs provided by the user.

As discussed above, the reallocation and repurposing of data over a wireless link may take place in a variety of ways. A wireless link may comprise a single channel over which messages may be transmitted between the console and the peripheral. Data parameters may be embedded within a single message, or each message may comprise a single data parameter. In the former case, the allocation of bits within the message, and typically the data payload, may be repurposed so that a parameter with a reduced data quality may be assigned a lesser number of bits, and a second parameter may thus be allocated a greater number of bits. In the latter case, a data parameter with a reduced data quality may be allocated a lesser number of messages, and a second data parameter may be able to increase the number of messages to transmit data.

A wireless link between a console and peripheral may comprise more than one channel. In this case the repurposing of bandwidth may comprise the reallocation of channels. For example, a wireless link comprises four channels, all four of which are allocated to the transmission of voice data. The console may receive a data quality index indicating that the voice data quality may be reduced. The console may then reallocate one of the voice data channels for other data purposes.

Figure 5:
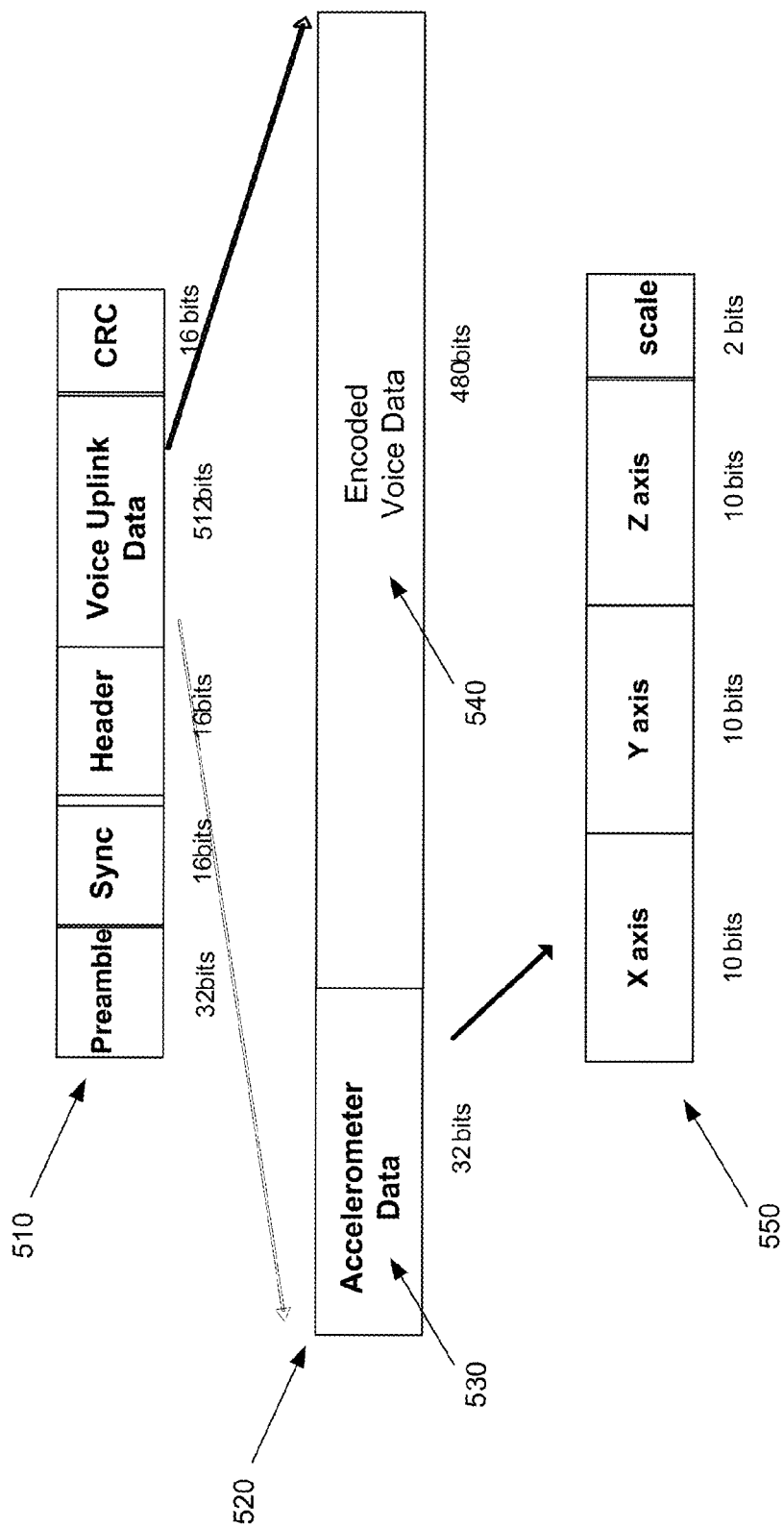
FIG. 5 illustrates an exemplary data protocol.

Referring now to FIG. 5, depicted is an exemplary data message 510 that may be transmitted to or from a wireless peripheral device by a video game console. Such a message may typically comprise a header, a synchronization word, a preamble, and an error correction code. The data to be transmitted is typically included in the data payload, and in this example comprises Voice Uplink Data 520. Voice Uplink Data 520 may further comprise data components Accelerometer Data 530 and Encoded Voice Data 540. In this particular example the Accelerometer Data 530 has been allocated 32 bits and the Encoded Voice Data 540 has been allocated 480 bits. The Accelerometer Data 530 may further be allocated 10 bits each for the X, Y and Z axes, and 2 bits for the scale factor. In a protocol where the length of the data payload is fixed, the initial allocation between the accelerometer data and the voice data may represent a decision as to the expected amount of bits needed to adequately represent each parameter according to the needs of the game application. When the data quality can be dynamically reallocated, the system need not be bound to the initial data allocations. As discussed above, a data quality indicator, or any other means of determining the amount of data needed for a particular time segment, may be used to reallocate the initial bandwidth or bit allocation.

Figure 5A:
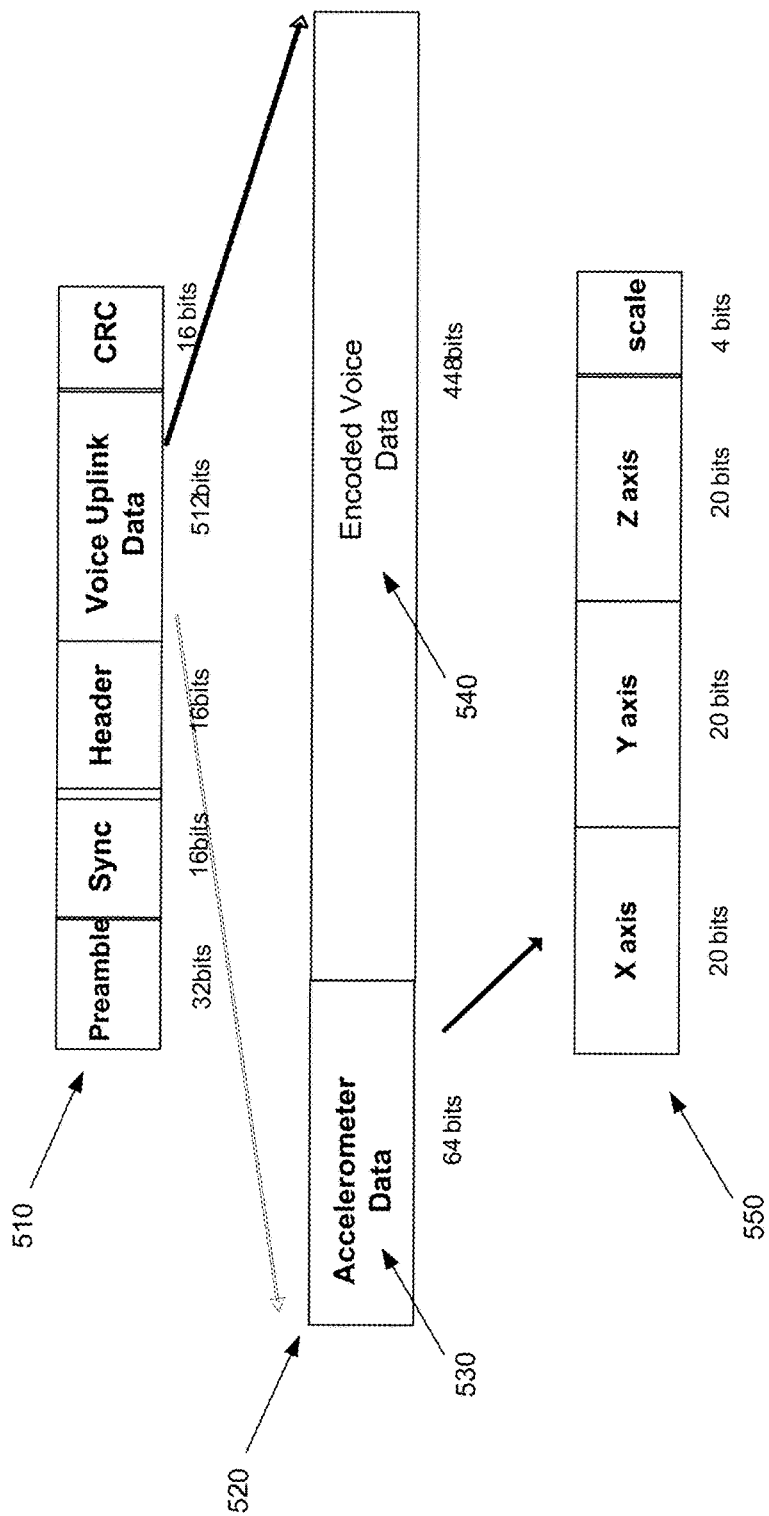
FIG. 5a illustrates an exemplary data protocol using an embodiment disclosed herein.

Referring to FIG. 5*a*, depicted is a reallocated data payload in response to one or more data quality indicators, the content of which indicate that voice data quality may be reduced, and that accelerometer data quality may be increased. Referring to the figure, Accelerometer Data 530 may now comprise 64 total bits, further allocating an additional 10 bits per axis, and doubling the number of scale factor bits to 4. The number of bits allocated to Encoded Voice Data 540 may be correspondingly reduced to 448 total bits. The total number of bits allocated to the data payload 520 may remain at 512 bits.

Figure 6:
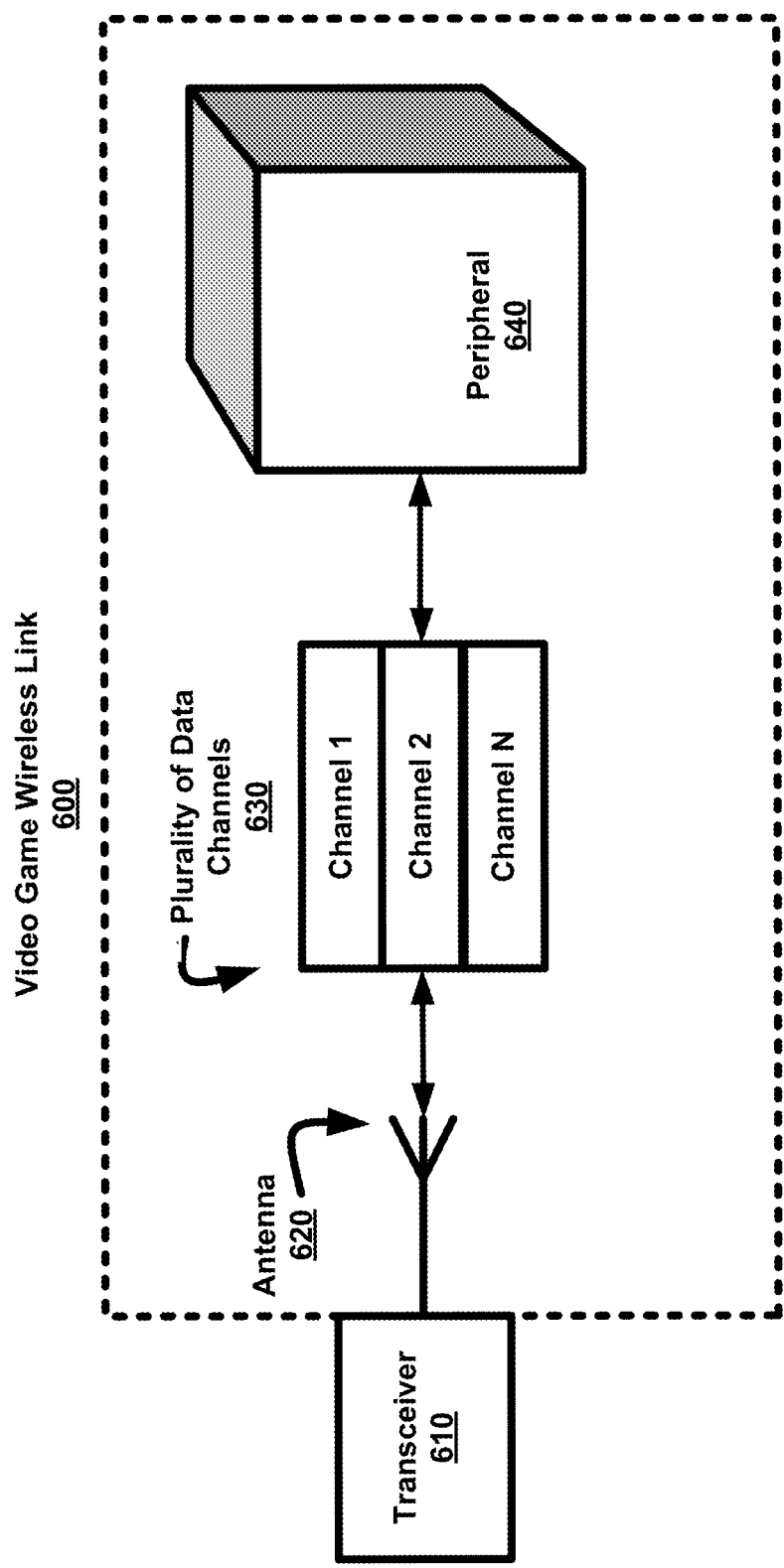
FIG. 6 illustrates an exemplary wireless data link.

Referring now to FIG. 6, depicted is an exemplary wireless video game link 600. The wireless video game link 600 may further comprise a transceiver 610 receiving and sending data for transmission to antenna 620. The data may be transmitted over a plurality of wireless data channels 630 to wireless peripheral 640. In a link design where the number of wireless channels is fixed, the initial allocation of channels reserved for voice and other data may represent a decision as to the expected amount of bandwidth needed to adequately represent each parameter according to the needs of the game application. When the data quality can be dynamically reallocated, the system need not be bound to the initial channel allocations. As discussed above, a video game context, a data quality indicator, or any other means of determining the amount of data needed for a particular time segment, may be used to reallocate the initial channel allocation.

Referring to FIG. 6, the plurality of data channels 630 may be reallocated in response to one or more video game contexts or data quality indicators, the content of which indicate that voice data quality may be reduced, and that other data parameters may be increased. For example, if the total number of data channels is four, during certain phases of the game application all four data channels may be allocated to voice data. As a result of the received data quality indicator, one or more of the four data channels 630 may be reallocated to transmit other data. Such other data may include system status and configuration data, other data available from the wireless peripheral, data needed for the next game scenario, and the like.

Figure 7:
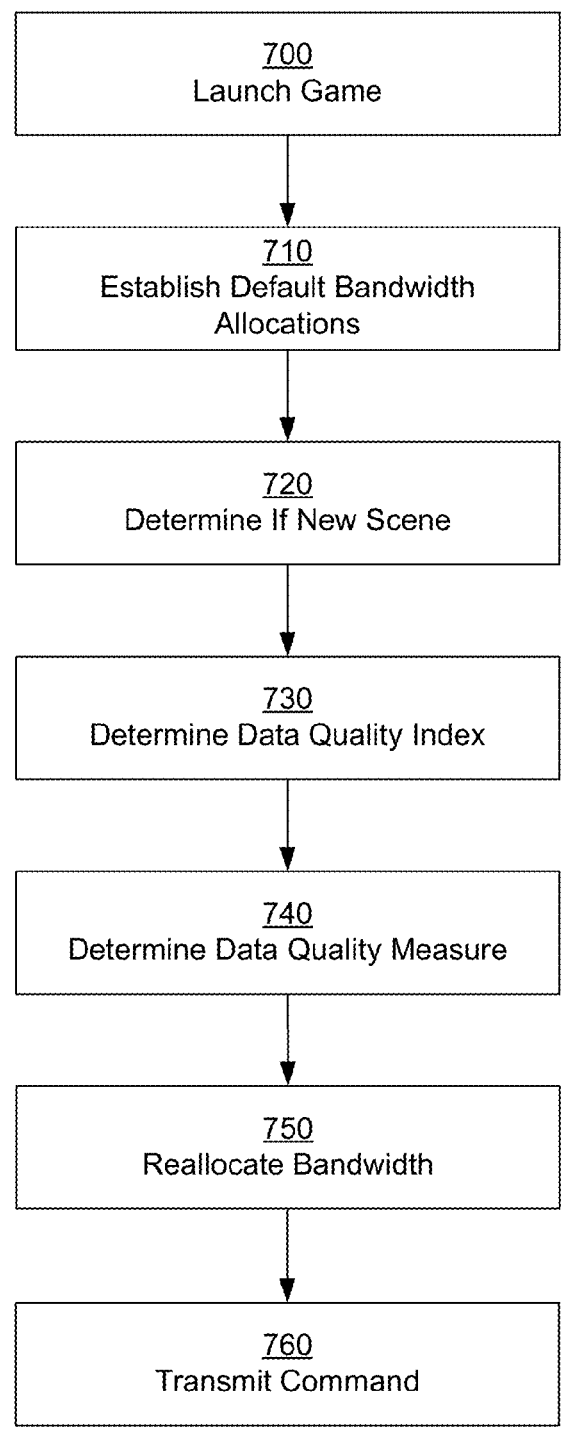
FIG. 7 illustrates an exemplary method of an embodiment disclosed herein.

Referring now to FIG. 7, illustrated is an exemplary process for the dynamic selection of data quality, wherein a game console executing the video software application may determine the data quality based on the context of the video game. In process 700, a video game application is launched by the game console. In process 710, default bandwidth allocations may be established for data parameters to be transmitted and received over a wireless link. As indicated above, video game scenes may be associated with a scene descriptor that indicates a data quality index. In process 720, it may be determined if a new scene has been initiated. If so, process 730 may determine a data quality index for the new scene, based on the general category of the scene. As discussed above, the scene descriptor may indicate the user interaction mode of a scene, such as "voice input expected," "controller movement expected", "button press expected," and the like.

In process 740, a data quality measure may be determined for the data parameter of interest. In process 750, the console may further reallocate the bandwidth of the wireless link in accordance with the updated data quality measure. In process 760, the console may then send an associated command to the peripheral. For example, the command may indicate that voice data sampling may be reduced or suspended, and may further indicate that motion sensor data be sampled at the maximum rate. The wireless peripheral may then increase the amount of motion sensor data transmitted to the console, either by sending additional data packets using additional channels, or using a greater number of bits in a fixed or variable length data and command word.

Figure 8:
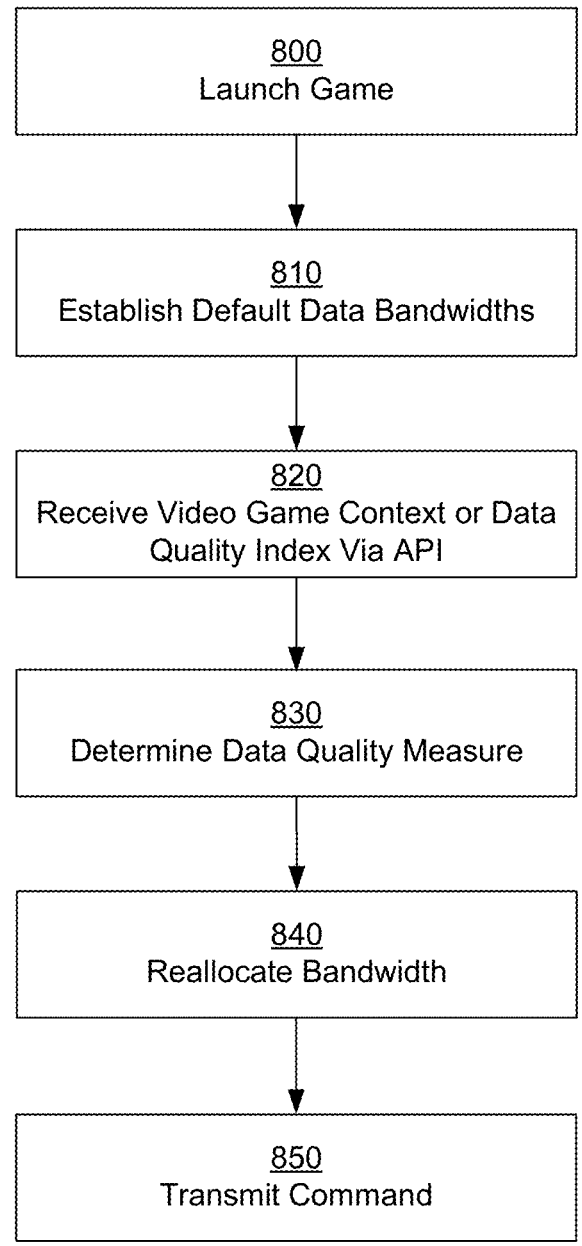
FIG. 8 illustrates an exemplary method of an embodiment disclosed herein.

Referring now to FIG. 8, illustrated is an exemplary process for the dynamic selection of data quality, wherein a game console executing the video software application may receive the data quality via an API provided to the video game application. In process 800, a video game application is launched by the game console. In process 810, default bandwidths may be established for data parameters to be transmitted and received over a wireless link. In process 820, the video game application may provide a video game context or data quality index via the API.

In process 830, a data quality measure may be determined for the data parameter of interest. In process 840, the bandwidth allocation of the wireless link may be reallocated in accordance with the data quality measure. In process 850, the console may then send an associated command to the peripheral.

Figure 9:
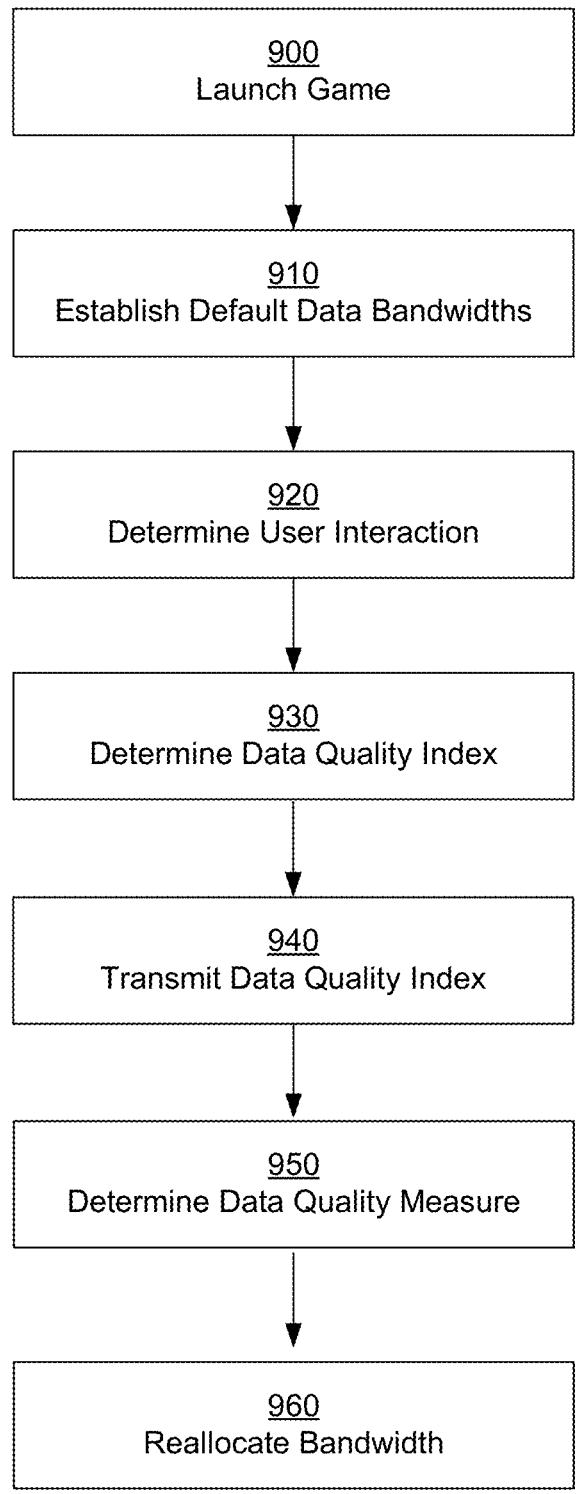
FIG. 9 illustrates an exemplary method of an embodiment disclosed herein.

Referring now to FIG. 9, illustrated is an exemplary process for the dynamic selection of data quality, wherein the video game console or peripheral may determine the data quality based on user interactions with the video game application. In process 900, a video game application is launched by the game console. In process 910, default data bandwidths may be established for data parameters to be transmitted and received over a wireless link. In process 920, the wireless peripheral may determine a user interaction. As discussed above, a wireless peripheral may comprise a microphone and a motion sensor. A mode within a game application may further allow the player to choose between providing a voice input or a motion input. If the player chooses to provide a motion input, the console and/or peripheral may determine that the voice sampling rate may be reduced or temporarily suspended in order to maximum bandwidth for transmission of motion data.

In process 930, a data quality measure may be determined for the data parameter of interest, based on the user interaction determined in process 920. In process 940. the peripheral may transmit data indicating the user interaction to the console. In some embodiments, the peripheral may transmit data indicating a user action, and the console may determine the user interaction based on received data. In process 950, a data quality measure may be determined for the data parameter of interest. In process 960, the bandwidth allocation of the wireless link may be reallocated in accordance with the data quality measure.

Lastly, while the present disclosure has been described in connection with the preferred aspects, as illustrated in the various figures, it is understood that other similar aspects may be used or modifications and additions may be made to the described aspects for performing the same function of the present disclosure without deviating there from. For example, in various aspects of the disclosure, a method allocating bandwidth over a wireless link was disclosed. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method of allocating finite data transmission capacity over a wireless link between a first computing device and a second computing device, the method comprising:

determining, by the first computing device, a distribution of the finite data transmission capacity based at least in part on content of data to be transmitted over the wireless link, wherein the data is associated with an application configured for execution on the first computing device;

executing the application on the first computing device;

during execution of the application on the first computing device, receiving an indication of a desired data quality for at least a portion of the content to be transmitted over said wireless link, wherein the indication is determined based on a real-time context of the executing application; and adjusting the distribution of the finite data transmission capacity in accordance with the indication of desired data quality.

2. The method according to claim 1, further comprising providing an application programming interface (API) configured to receive the indication.

3. The method according to claim 1, wherein the indication is based at least in part on a scene descriptor.

4. The method according to claim 2, wherein the indication is based at least in part on a data parameter received via the API.

5. The method according to claim 1, further comprising determining a data resolution based on the indication.

6. The method according to claim 1, further comprising determining a data frequency based on the indication.

7. The method according to claim 1, wherein the indication is received from the second computing device over the wireless link.

8. The method according to claim 1, wherein the indication is based on a user interaction with the second computing device.

9. A method of allocating data transmission capacity in a wireless link, the wireless link usable to transmit data between a computing device and a wireless peripheral, the data associated with at least two data sources, the method comprising:

allocating a first portion of the data transmission capacity for transmitting data from a first data source of the wireless peripheral to the computing device;

allocating portions of the data transmission capacity that is not allocated to the first data source for transmitting data from a second data source of the wireless peripheral to the computing device;

during execution of an application on the computing device, receiving an indication of a data quality measure for content of data to be transmitted over the wireless link during the execution of the application, such data to be transmitted including one or both of the data from the first data source and the data from the second data source, the data quality measure determined based on a context of the application; and re-allocating (1) data transmission capacity previously allocated to the first portion and (2) the portions of data transmission capacity not allocated to the first data source based at least in part on the data quality measure.

10. The method according to claim 9, further comprising executing an application programming interface (API) configured to receive the indication from the application, wherein the indication is based on a context of the application.

11. The method according to claim 9, further comprising transmitting at least one command to at least one wireless peripheral including the data quality measure.

12. The method according to claim 10 further comprising determining a voice sampling rate.

13. The method according to claim 11, wherein the at least command further indicates additional data to be transmitted in accordance with the first portion.

14. A computing system configured to subdivide a preallocated data transmission capacity over a wireless link, the computing system comprising:

a computing device and at least one wireless peripheral, the wireless peripheral configured to transmit a plurality of data types over the wireless link, wherein the at least one wireless peripheral is configured to communicate with the computing device over the wireless link;

the computing device comprising at least one processor and a memory communicatively coupled to the processor when the computing device is operational; the memory having stored therein computer instructions that upon execution by the at least one processor cause:

subdividing the data transmission capacity at least in part based on data to be transmitted over the wireless link and assigning subdivided portions of the data transmission capacity based at least in part on a selected sample rate to be used by an application configured for execution on the computing device;

executing the application;

during execution of the application, determining that the selected sample rate has changed and determining a data quality measure for the selected sample rate; and reallocating the subdivided portions of the data transmission capacity in accordance with a data quality index, the data quality index indicating a desired data quality measure.

15. The computing system according to claim 14, further comprising an application programming interface (API) configured to receive an indication of the selected sample rate.

16. The computing system according to claim 14, wherein the sample rate is selected based at least in part on a context of the application.

17. The computing system according to claim 15, wherein said the sample rate is selected based at least in part on a data parameter received using the API.

18. The computing system according to claim 14, further comprising determining a data resolution as a function of the selected sample rate.

19. The computing system according to claim 16, further comprising determining a data frequency as a function of the selected sample rate.

20. The computing system according to claim 16, wherein the selected sample rate is based on a user interaction with the wireless peripheral.

* * * * *